No. 742,341. Patented October 27, 1903.

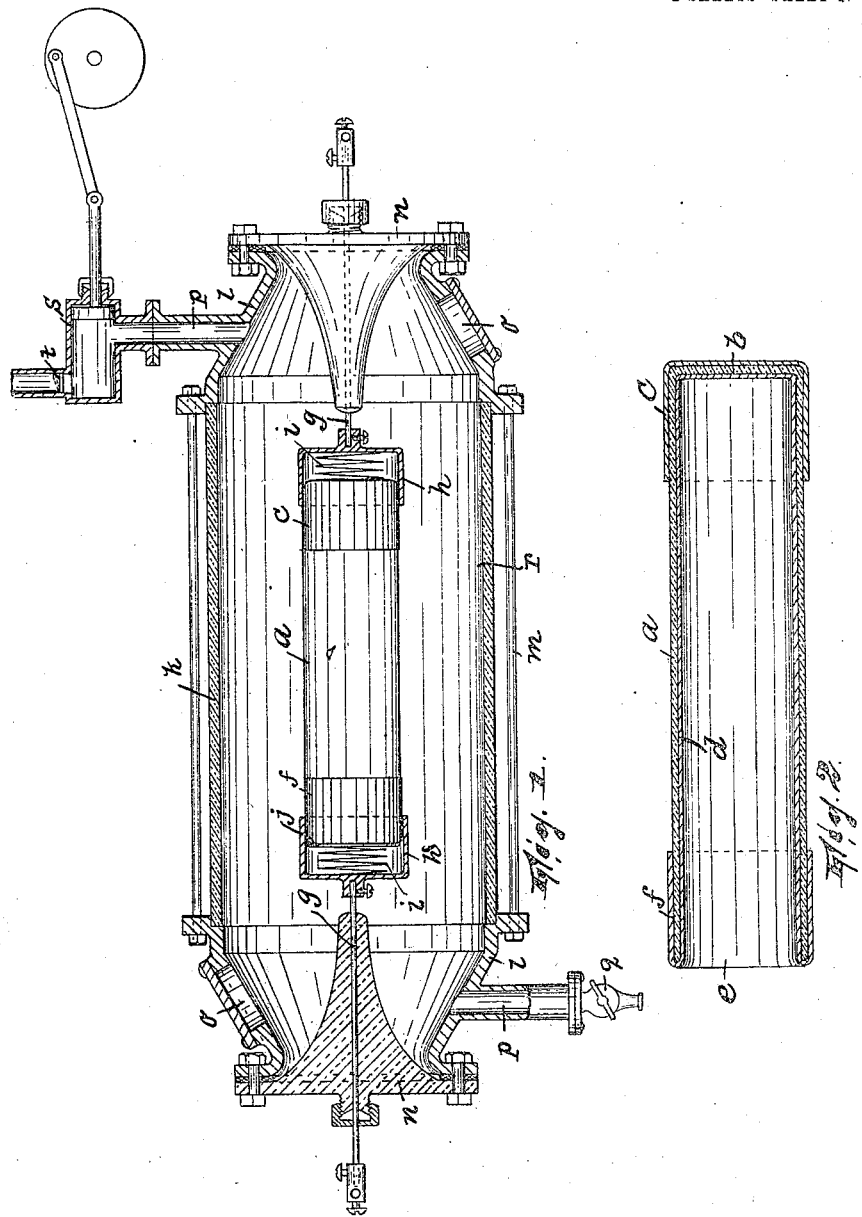

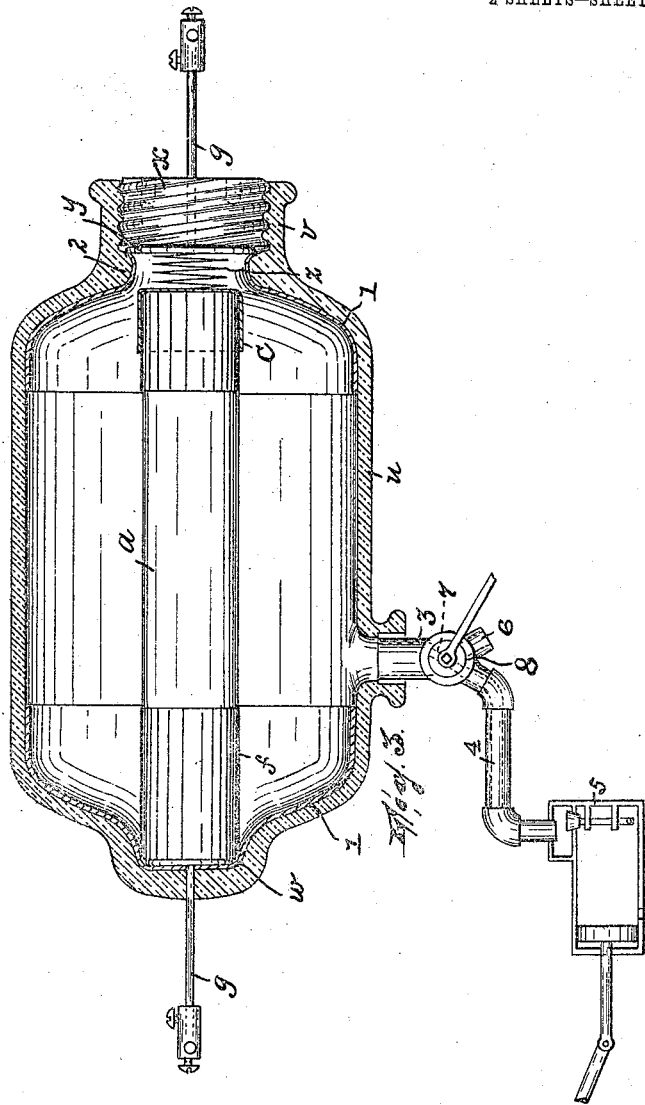

UNITED STATES PATENT OFFICE.

JOSEPH MILLER AND FRANK M. ASHLEY, OF NEW YORK, N. Y., ASSIGNORS OF ONE-THIRD TO ISAAC L. MILLER, OF PATERSON, NEW JERSEY.

OZONATOR.

SPECIFICATION forming part of Letters Patent No. 742,341, dated October 27, 1903.

Application filed December 19, 1902. Serial No. 135,869. (No model.)

*To all whom it may concern:*

Be it known that we, JOSEPH MILLER and FRANK M. ASHLEY, citizens of the United States, residing in New York city, in the county and State of New York, have invented certain new and useful Improvements in Ozonators; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

Notwithstanding the many and valuable uses for which the gas ozone is available it has not up to the present time been possible, so far as we are aware, to produce it in quantities copious enough to make it a commercially-known article.

The most prolific and economical source for the production of ozone is doubtless any one in which electrical action plays the principal part. In view of the fact, however, that the existence of heat in proximity to ozone is destructive of it, bringing about its retransformation into oxygen, it has come to be recognized that means for producing ozone electrically in any appreciable quantities, even experimentally, must be such as suppresses to the minimum the evolution of heat. Instead, for instance, of employing the direct spark discharge of a Ruhmkorff coil it has been proposed to accomplish the desired effect by means which would convert the spark discharge into what is known as the "silent discharge," thus conserving to the production of ozone energy which would otherwise go to form the spark.

The present invention has for its object the production of an apparatus in which ozone may be generated through the medium of the silent discharge under conditions which shall be highly conducive to an abundant production of ozone.

The preferred form of the ozone-producing part proper of our apparatus is a device having the essential features structurally, at least, of an ordinary Leyden jar, said device consisting of a dielectric body, preferably in the form of a tube closed at one end, and electrodes, one of which covers the extremity of the closed end of the tube and the other of which covers the inside surface of the tube and is turned back at the tube's mouth, so as to externally embrace a part of the mouth portion of the tube, being, moreover, at this point in such spaced relation to the electrode at the tube's closed end as to at least prevent the formation of the undesirable spark discharge; but inasmuch as good results have been obtained by simply disposing the electrodes in contact with a dielectric body in such relation that while being spaced sufficiently to at least prevent the formation of the spark discharge they are not spaced greater than the distance corresponding to the surface course on said body of the silent discharge between said electrodes we do not wish to be necessarily limited to the said preferred form of the invention.

Our invention will be found fully illustrated in the accompanying drawings, wherein—

Figure 1 is a longitudinal vertical sectional view of one form of the apparatus. Fig. 2 is a longitudinal sectional view of a detail thereof, and Fig. 3 is a longitudinal sectional view of a modification of the apparatus.

In the present instance the silent-discharge medium consists of a vial-shaped body $a$, of vitreous substance, preferably glass, whose closed end $b$ is covered by a thin metallic layer $c$—such as tin-foil, amalgam, or the like—forming an electrode, while its entire inner surface is covered by a similar metallic layer $d$, which is extended out of the mouth $e$ of said vial-shaped body and is laid back so as to surround the mouth portion of the body, as at $f$, forming the other electrode. The surface measurement of the body $a$ should be as large as practicable—the larger the better—except that relatively the distance between the adjoining edges of the metallic layer $c$ and the portion $f$ of the inside metallic layer should not be too limited.

$g$ represents metallic terminals, which in that form of the apparatus seen in Fig. 1 carry at their adjoining ends sockets $h$, in which are arranged springs $i$. The silent-discharge device, already described, is fixed in these sockets in the manner shown in Fig. 1. When in position, one spring $i$ bears against the closed end of the silent-discharge device, while the other spring bears against a disk $j$, which takes against the open end of said device. The sockets $h$ are formed of conducting material and are preferably of such size as to snugly fit the ends of the silent-discharge device.

As is usual in apparatus of this nature, the field immediately surrounding the ozone-producing medium is inclosed, so as to prevent the produced ozone from becoming dissipated into the atmosphere and so that, if desired, only pure oxygen may be acted upon. We therefore provide a casing, which is preferably cylindrical in general form and comprises as its principal elements a cylinder $k$ and heads $l$, drawn against the ends of the cylinder by bolts $m$. With the double object of having the cylinder $k$ of non-conducting material and of permitting visual inspection of the interior of the apparatus this cylinder is preferably made of transparent glass. The bolts are made of fiber or some other suitable non-conducting material. The heads $l$, which are substantially of truncated conical form, have their outer or smaller ends closed by insulating-closures $n$, securely fitted thereto and carrying the terminals $g$. Each of these is inwardly conical, so as to insure against short-circuiting between the terminal $g$ and the head $l$. The heads $l$ are each provided with a suitably-closured opening $o$, designed to permit access by the hand to the interior, and with a duct $p$. One of the ducts may be provided with a petcock $q$, which constitutes the admission-port to the above-described ozone-generating chamber $r$, while the other may communicate with the cylinder of a suitable pump $s$, which is adapted to draw the ozone from the producing-chamber $r$ and force it past a valve $t$ to the reservoir therefor. The various fittings which go to form the chamber $r$ are made so that their joints are hermetic.

The accessories of the silent-discharge device may be as in Fig. 3. The chamber in which the device is placed may be formed of a transparent bulbular body $u$, having one end formed with a threaded opening $v$ for the admission of the silent-discharge device and the other end formed with a seat $w$, adapted to receive one end of said device. The threaded mouth of body $u$ is provided with a tightly-fitting screw-plug $x$, through which extends one of the terminals $g$, whose inner end is fixed to a flanged hollow cap $y$, adapted to receive the adjacent (closed) end of the silent-discharge device, a spring $z$ being interposed to hold the silent-discharge device steady. The inside of each end portion of the body $u$ is lined, as at 1, with a coating of tin-foil or the like, that adjacent the mouth end of the body $u$ being laid around an internal shoulder 2 of the latter, so that the flanged portion of the cap may form a good electrical contact therewith when the plug $x$ is screwed against it. The terminal $g$ at the closed end of the body $u$ has electrical contact with the coating of tin-foil 1. Thus the bulbular body $u$ serves not only the function of a confining-chamber for the silent-discharge device, but an auxiliary silent-discharge medium. Instead of ozonizing the air or oxygen as it moves past and in proximity to the silent-discharge device it is found perhaps better to charge the chamber containing the silent-discharge device with several atmospheres of the air or oxygen to be acted upon, since it is possible to act upon considerably more than one atmosphere of the air or oxygen. To this end the body $u$ may have a port 3, communicating both with the discharge 4 from a pump 5 and with a discharge 6 to the ozone-reservoir, a valve 7, having suitable means for shifting it, being provided, so as to first connect the port 3 with port 4 to permit the inflow of air or oxygen, then oppose it to an abutment 8 until the charge of air or gas in chamber $u$ is ozonized, and then connect it with discharge-port 6, when the ozonizing is completed. The terminals $g$ being connected with the terminals of a Ruhmkorff coil or other similar high-potential medium, the electrical charge finds its way as a silent discharge across the surface of the non-conducting medium between the coatings at its end portions, ozonizing the ambient air or oxygen, whichever is brought into effective proximity to the silent-discharge device.

Having thus fully described our invention, what we claim as new, and desire to secure by Letters Patent, is—

1. In an ozone-producing apparatus, the combination of a dielectric body and two electrodes arranged in contact with the surface of said body at a distance apart greater than the sparking distance therebetween but less than the distance corresponding to the surface course on said body of silent discharge between said electrodes, substantially as described.

2. In an ozone-producing apparatus, the combination of a dielectric body and two layer-like electrodes arranged in laminated contact with the surface of said body at a distance apart greater than the sparking distance therebetween but less than the distance corresponding to the surface course on said body of silent discharge between said electrodes, substantially as described.

3. In an ozone-producing apparatus, the combination of a dielectric layer-like body and two layer-like electrodes arranged in laminated contact with the same face or surface of said body at a distance apart greater than the sparking distance therebetween but less than the distance corresponding to the surface course on said body of silent discharge between said electrodes, substantially as described.

4. In an ozone-producing apparatus, the combination of a tubular dielectric body and two band-like electrodes arranged in laminated contact with the surface of said body at a distance apart greater than the sparking distance therebetween but less than the distance corresponding to the surface course on said body of silent discharge between said electrodes, substantially as described.

5. In an ozone-producing apparatus, the combination of a dielectric tubular body closed at one end, a cap-shaped electrode receiving and lying in laminated contact with the closed end of said tube and another and layer-like electrode lining said tubular body and extending out of and surrounding the mouth portion of said tube, substantially as described.

In testimony that we claim the foregoing we have hereunto set our hands this 10th day of December, 1902.

JOSEPH MILLER.
FRANK M. ASHLEY.

Witnesses:
JOHN W. STEWARD,
J. B. NEWTON.